United States Patent Office 3,407,045
Patented Oct. 22, 1968

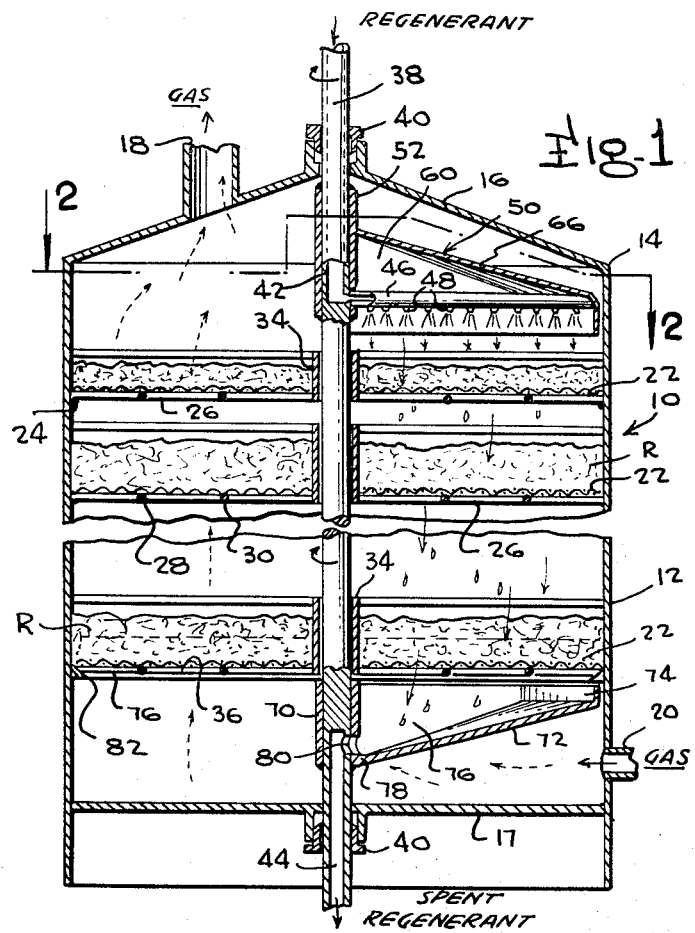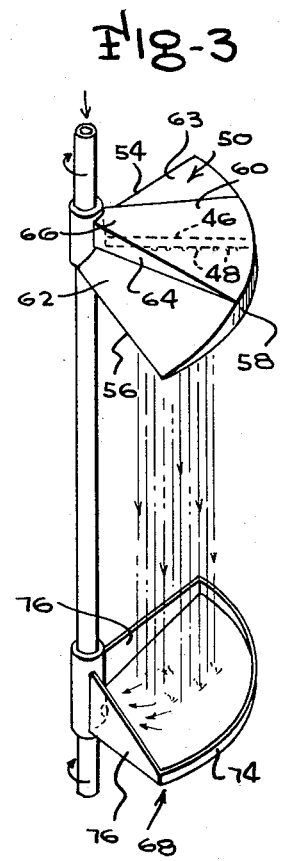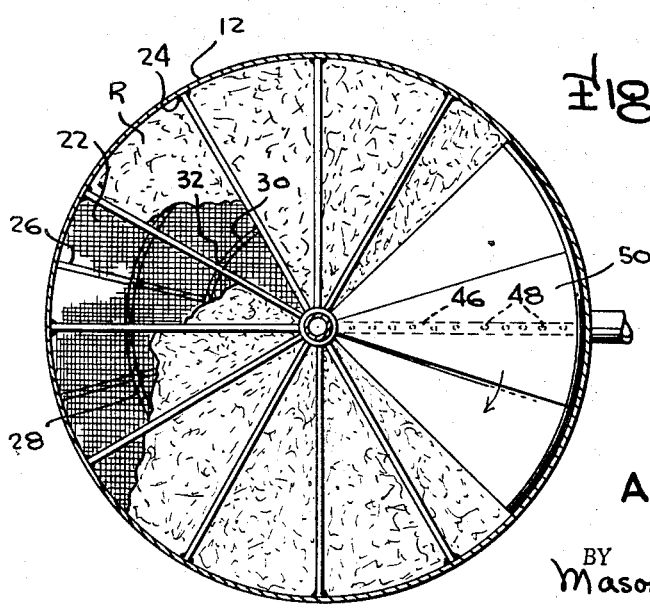

3,407,045
GAS PURIFIER
Arthur R. Temple, 7803 Yolanda Road,
Richmond, Va. 23239
Filed Mar. 3, 1965, Ser. No. 436,858
7 Claims. (Cl. 23—283)

This invention relates generally to a gas purifying apparatus. More particularly, the present invention is concerned with a continuous operation gas purifying apparatus.

Gas purifying apparatus are, of course, old and well known and numerous variations in design have been made to improve the effectiveness and efficiency gas purifiers. The use of ion exchange adsorbents as the adsorbing medium has proved to be a substantial advancement for many types of impurities contained in gas. Such previously known gas purifiers using ion exchange adsorbents have been discontinuous in their operation, in order to effect the necessary regeneration of the ion exchange resins. Manifestly, this shut down time was costly, since the apparatus was not usable during the resin regeneration period. Attempts to produce a continuous operation of gas purifying apparatus—that is, an apparatus which would simultaneously regenerate the resins capacity for exchange of ions and adsorb impurities—have not proved satisfactory for a number of reasons, principally due to the fact that the regenerant for the ion exchange resins would be entrained in the otherwise purified gas removed from the gas purifying apparatus. This entrainment, therefore, undesirably necessitated an additional purifying step to remove the regenerant from the gas.

Accordingly, it is one of the principal objects of the present invention to provide a continuous operation of gas purifier which avoids any shut down time for regeneration of the solid adsorbents by a liquid regenerant.

This invention also includes as an object the provision of a gas purifier which operates continuously to regenerate ion exchange adsorbents while simultaneously permitting flow of the contaminated gas to contact the resins.

A further object of the present invention is the provision of gas purifying apparatus which substantially avoids the entrainment of the ion exchange adsorbent regenerant in the effluent purified gas.

Other objects and advantages of the present invention will become apparent to those skilled in the art from the following description when read in conjunction with the accompanying drawing, wherein:

FIGURE 1 is an elevational view in cross section partly broken away of the gas purifying apparatus according to the present invention;

FIGURE 2 is a cross sectional view partly broken away taken along lines 2—2 of FIGURE 1;

FIGURE 3 is a perspective view of the header, top hood, and bottom tray mounted upon the rotating shaft.

Briefly, the present invention includes a novel combination and arrangement of a header for spraying regenerant liquid into an ion exchange resin bed and a superposed top hood which extends arcuately to include a substantial portion of the cross sectional area within the cylindrical housing of the gas purifying apparatus and a bottom tray which extends arcuately beyond, or is at least coextensive with, a downward projection of the hood, the hood and the tray operating to substantially limit the gas flow in the area directly below the header so that the regenerant sprayed from the header will be substantially prevented from being entrained in the effluent purified gas.

In the drawings—and FIGURE 1 in particular—the gas purifying apparatus, according to the present invention, is generally designated by the numeral 10 and includes a cylindrical housing 12, usually made of metal, such as stainless steel, or may be plastic coated steel, or any other metal compatible with the gas, regenerant, and ion exchange resins. Integral with or otherwise secured to the upper end of the housing, as at 14, is a top 16, which may be conical, as shown, or otherwise shaped for convenience, since its particular shape does not form a part of the present invention. A bottom 17 is also provided to form an enclosed volume whereby the contaminated gas may be purified.

Positioned in the top is a gas flow opening 18. Only one such opening is shown in the drawing; however, it is to be understood that numerous such openings could be provided, or one large opening, which permits unobstructed flow, could be used. Towards the bottom of the gas purifier is a gas opening 20, which may be in the cylindrical housing 12 or in the bottom 17. Opening 20 is similar to gas opening 18, in that it communicates with the interior of the housing. Again, any suitable number of these gas openings can be used, and—as is true with opening 18—the diameter of the gas opening 20 depends upon the flow rate of the gas being treated.

As best shown in FIGURE 1, a plurality of shelves 22 is secured to the interior of the housing by any suitable means, such as welding 24. The shelves are formed by radial struts 26, which are secured to the interior housing by the weld spots 24 and are strengthened by concentric rings 28 and 30, which are welded, as at 32, or otherwise suitably secured to the radial struts 26. Each shelf is round and coextensive with the interior of the housing. Additionally, each shelf includes a hub portion 34, which is located at the central axis of the housing.

The number of shelves 22 can vary from one to ten or more, and it is not particularly important to the present invention. Each shelf, however, is designed to be provided with a gas permeable screen 36. The size of the openings is variable, depending upon the size of the solid ion exchange resins R, which are placed on these gas permeable screens. Fitting loosely within the hub portion of each of the shelves and thus in part lending support to the shelves is a rotatable shaft 38, which extends along the central axis of the cylindrical housing 12 and is suitably secured by bearings 40 in the top 16 and the bottom 17.

As can be seen from FIGURE 1, the upper and lower portions of the shaft 38 are hollow to provide regenerant passageways 42 and 44, respectively. Secured or integral with the upper portion of the shaft 38 and in fluid communication with gas passageway 42 is a header 46, which extends radially from the shaft to a point almost in contact with the inner surface of the cylinder housing. As shown in FIGURE 2, the header 46 is in the form of an elongated tube having a plurality of nozzles 48, as shown in FIGURE 1, which depend from the underside of the header and are designed to spray a predetermined amount of regenerant fluid onto the topmost shelf 22.

Positioned above the header 46 is the top hood 50. This hood is fixed to the shaft 38 by means of an integral sleeve 52. The hood 50 is fan-shaped, or otherwise takes the form of a sector having radial sides 54 and 56, and the outer arcuate edge 58. As shown in FIGURE 3, the hood 50 has a recess 60, which rises above and between lower side portions 62 and 63. As also shown in FIGURE 3, the recess 60 is formed by a pair of diverging sides 64 on each side of the upper surface 66 of the recess 60. The purpose of the recess 60 is to receive header 46 and thus protect the spray of the regenerant from being entrained in the gas flow. No gas that enters recess 60 with entrained portions of the regenerant is permitted to exit without contact with the surface of the recess or the hood and thus cause the entrained regenerant to be removed from the gas.

Also positioned on the rotating shaft 38 and located directly beneath the top hood, as shown in FIGURE 3, is the bottom tray 68, which should extend arcuately beyond the downward projection of the hood 50, or at least be coextensive with the hood. The bottom tray, as shown in FIGURES 1 and 3, is fixed to the shaft by sleeve 70 and includes an upwardly flaring base 72, which extends substantially to the interior surface of the housing 12. The bottom tray is also provided with an upstanding lip 74 and sides 76. The sleeve 70 is provided with a port 78, which is aligned with and in fluid communication with a corresponding port 80, which fluidly connects with the regenerant passageway 44.

Immediately above the bottom tray 68 is an inwardly extending edge 82, which overhangs lip 74 in order to prevent any of the regenerant by-passing the bottom tray 68.

The adsorbents that may be employed may vary considerably and depend upon the impurities which are to be removed from the gas. The present invention, however, includes the use of many of the zeolites, whether of the anionic or cationic type. The cationic resins may be suitably regenerated usually with mineral acids, such as hydrochloric or sulfuric, while the anionic resins are regenerated with alkali, usually caustic soda. The concentrations of the regenerant in water are usually from about 1 to 10%, although this percentage is not critical and forms no part of the present invention.

The ion exchange adsorbents generally found usable are those such as the amine formaldehyde resins or the tannin formaldehyde resins; however, any of the synthetic gel zeolites of the natural clays or sands may also be used as long as they may be regenerated with liquid regenerants.

The operation of the gas purifying apparatus should be obvious from the above description; however, a concise statement may be helpful.

The ion exchange adsorbents R, such as the zeolites, may be placed in the shelves 22 and gas admitted to the purifier through opening 20 and exiting through opening 18 while passing through the screens 36 of the shelves and in turn intimately contacting the ion exchange adsorbents R to remove the impurities from the gas. Simultaneously, with the flow of gas, the header 46, its hood 50, and bottom tray 68 are rotated and regenerant sprayed from the nozzles 48 onto the topmost shelf. The regenerant liquid passes down from one shelf to another and finally is collected in the bottom tray 68, passing through ports 78 and 80 out into passageway 44 for collection. The speed of rotation of the header is designed to be slow, such that the regenerant will have substantially passed through the shelves and collected in the bottom tray before the bottom tray moves from its collecting position.

From this operation it is manifest that the gas may be purified at the same time that the ability of the ion exchange adsorbents to remove impurities is maintained by regenerating the adsorbents. Since the gas flows at the same time the regenerant is sprayed, it is significant, in accordance with the present invention, that the bottom tray 68 and the top hood 50 substantially prevent the flow of gas in the area immediately below the header and particularly between the hood and the bottom tray. Thus, the possibility of entrainment of the regenerant of the gas is substantially removed, and it has been found that the purified gas removed from port 18 contains significant amounts of regenerant.

The gas is shown counter current to the flow of the regenerant; however, it is obvious that the gas flow could be reverse in direction.

From the foregoing detailed description it will be evident that there are a number of changes, adaptations, and modifications of the present invention which come within the province of those skilled in the art; however, it is intended that all such variations not departing from the spirit of the invention be considered as within the scope thereof as limited solely by the appended claims.

I claim:

1. Gas purifying apparatus for the continuous regeneration of solid adsorbents during the flow of gas through said adsorbent comprising:

an upright cylindrical housing,
a closed top and a closed bottom secured to said housing,
gas flow openings in said top and bottom providing a purified gas outlet at one end of the housing and a contaminated gas inlet at the other end of the housing,
at least one shelf positioned within said housing,
said shelf having a gas permeable screen,
solid adsorbents covering the screen of said shelf,
a header for spraying a regenerant for the adsorbents onto the top shelf,
regenerant inlet means connected to said header,
a top hood fixed relative to said header and extending above said header to include a substantial portion of the cross sectional area of said cylindrical housing,
a bottom tray fixed relative to said hood and positioned beneath the lowermost shelf,
said tray being at least coextensive to the area of the hood and header when projected downwardly on said tray,
said tray collecting regenerant sprayed from said header,
regenerant otulet means connected to said bottom tray for removal of said regenerant,
rotation means providing relative angular movement between said shelf and said header so that regenerant is continuously sprayed from said header progressively over all said adsorbents on said relatively moving shelf to regenerate said adsorbents,
said hood, said tray, said rotation means, said inlet and said outlet being so constructed and arranged to cause regenerant to pass through the portion of the housing between the tray and the hood and at the same time to cause the gas to flow primarily through the remaining portion of the housing,
said hood and said tray being so constructed and arranged to substantially prevent entrainment of regenerant in the gas.

2. Gas purifying apparatus for the continuous regeneration of ion exchange resins during the flow of gas through said resin comprising:

an upright cylindrical housing,
a closed top and a closed bottom secured to said housing,
gas flow openings in said top and bottom providing a purified gas outlet at one end of the housing and a contaminated gas inlet at the other end of the housing,
at least one shelf positioned within said housing,
said shelf having a gas permeable screen,
ion exchange resins covering the screen of said shelf,
a header for spraying ion exchange regenerant onto the top shelf,
regenerant inlet means connected to said header,
a top hood fixed relative to said header and extending above said header to include a substantial portion of the cross sectional area of said cylindrical housing,
a botom tray fixed relative to said hood and positioned beneath the lowermost shelf,
said tray extending arcuately beyond the area of the hood and header when projected downwardly on said tray,
said tray collecting regenerant sprayed from said header,
regenerant outlet means connected to said bottom tray for removal of said regenerant,
a vertical drive shaft mounted for rotation within said housing and carrying said header, said hood, and said tray fixed thereto to provide angular movement relative to each said shelf,
means for rotating said shaft so the regenerant is continuously sprayed from said header progressively over all said resins on said relatively moving shelf to regenerate said resins, said hood, said tray, said rotation means, said inlet and said outlet being so constructed and arranged to cause regenerant to pass through the portion of the housing between the tray and the hood and at the same time to cause the gas to flow primarily through the remaining portion of the housing, said hood and said tray being so constructed and arranged to substantially prevent entrainment of regenerant in the gas.

3. Gas purifying apparatus for the continuous regeneration of ion exchange resins during the flow of gas through said resin comprising:

an upright cylindrical housing, a closed top and a closed bottom secured to said housing, gas flow openings in said top and bottom providing a purified gas outlet at one end of the housing and a contaminated gas inlet at the other end of the housing, at least one shelf positioned within and secured to said housing, said shelf having a gas permeable screen, ion exchange resins covering the screen of said shelf, a header for spraying ion exchange regenerant onto the top shelf, regenerant inlet means connected to said header, a top hood fixed relative to said header and extending above said header to include a substantial portion of the cross sectional area of said cylindrical housing, a bottom tray fixed relative to said hood and positioned beneath the lowermost shelf, said tray extending arcuately beyond the area of the hood and header when projected downwardly on said tray, said tray having upstanding sides and a lip, said tray collecting regenerant sprayed from said header, regenerant outlet means connected to said bottom tray for removal of said regenerant, a vertical drive shaft mounted for rotation within said housing and carrying said header, said hood, and said tray fixed thereto to provide angular movement relative to each said shelf, means for rotating said shaft so that regenerant is continuously sprayed from said header progressively over all said resins on said relatively moving shelf to regenerate said resins, said hood, said tray, said rotation means, said inlet and said outlet being so constructed and arranged to cause regenerant to pass through the portion of the housing between the tray and the hood and at the same time to cause the gas to flow primarily through the remaining portion of the housing, said hood and said tray being so constructed and arranged to substantially prevent entrainment of regenerant in the gas.

4. Gas purifying apparatus for the continuous regeneration of ion exchange resins during the flow of gas through said resin comprising:

an upright cylindrical housing, a closed top and a closed bottom secured to said housing, gas flow openings in said top and bottom providing a purified gas outlet at one end of the housing and a contaminated gas inlet at the other end of the housing, at least one shelf positioned within and secured to said housing, said shelf having a gas permeable screen, ion exchange resins covering the screen of said shelf, a header extending to the outer circumference of said housing for spraying ion exchange regenerant onto the top shelf, regenerant inlet means connected to said header, a top hood fixed relative to said header and extending above said header to include a substantial portion of the cross sectional area of said cylindrical housing, said hood being recessed to receive said header, a bottom tray fixed relative to said hood and positioned beneath the lowermost shelf, said tray extending arcuately beyond the area of the hood and header when projected downwardly on said tray, said tray collecting regenerant sprayed from said header, regenerant outlet means connected to said bottom tray for removal of said regenerant, a vertical drive shaft mounted for rotation within said housing and carrying said header, said hood, and said tray fixed thereto to provide angular movement relative to each said shelf, means for rotating said shaft so that regenerant is continuously sprayed from said header progressively over all said resins on said relatively moving shelf to regenerate said resins, said hood, said tray, said rotation means, said inlet and said outlet being so constructed and arranged to cause regenerant to pass through the portion of the housing between the tray and the hood and at the same time to cause the gas to flow primarily through the remaining portion of the housing, said hood and said tray being so constructed and arranged to substantially prevent entrainment of regenerant in the gas.

5. Gas purifying apparatus for the continuous regeneration of ion exchange resins during the flow of gas through said resin comprising:

an upright cylindrical housing, a closed top and a closed bottom secured to said housing, gas flow openings in said top and bottom providing a purified gas outlet at one end of the housing and a contaminated gas inlet at the other end of the housing, at least one shelf positioned within and secured to said housing, said shelf having a gas permeable screen, ion exchange resins covering the screen of said shelf, a header for spraying ion exchange regenerant onto the top shelf, regenerant inlet means connected to said header, a top hood fixed relative to said header and extending above said header to include a substantial portion of the cross sectional area of said cylindrical housing, a bottom tray fixed relative to said hood and positioned beneath the lowermost shelf, said tray extending arcuately beyond the area of the hood and header when projected downwardly on said tray, said tray collecting regenerant sprayed from said header, regenerant outlet means connected to said bottom tray for removal of said regenerant, a vertical drive shaft mounted for rotation within said housing and carrying said header, said hood, and said tray fixed thereto to provide angular movement relative to each said shelf, means for rotating said shaft so that regenerant is continuously sprayed from said header progressively over all said resins on said relatively moving shelf to regenerate said resins, said hood, said tray, said rotation means, said inlet and said outlet being so constructed and arranged to cause regenerant to pass through the portion of the housing between the tray and the hood and at the same time to cause the gas to flow primarily through the remaining portion of the housing, said hood and said tray being so constructed and arranged to substantially prevent entrainment of regenerant in the gas, said shaft having a hollow top and bottom portion which are in fluid communication respectively with the regenerant inlet means and the regenerant outlet means.

6. The gas purifying apparatus of claim 5 wherein the hood and tray each are substantially formed as a sector of a cross section of said housing.

7. The gas purifying apparatus of claim 5 wherein the tray has upstanding sides and a lip to collect the regenerant as it falls from the lowest shelf.

References Cited

UNITED STATES PATENTS

| | | | |
|---|---|---|---|
| 1,021,248 | 3/1912 | Gross et al. | 210—273 X |
| 1,895,618 | 1/1933 | Fedeler | 55—242 X |
| 2,304,398 | 12/1942 | Campbell | 23—288.3 |
| 2,337,956 | 12/1943 | Yerrick et al. | 23—288.3 X |
| 2,739,928 | 3/1956 | Thayer | 23—288.3 X |

FOREIGN PATENTS

| | | |
|---|---|---|
| 353,837 | 1/1930 | Great Britain. |

REUBEN FRIEDMAN, *Primary Examiner.*

C. DITLOW, *Assistant Examiner.*